United States Patent
Zhang et al.

(10) Patent No.: US 9,853,549 B2
(45) Date of Patent: Dec. 26, 2017

(54) BOOST-BUCK CONVERTING CIRCUIT, POWER MANAGEMENT MODULE AND LIQUID CRYSTAL DRIVING DEVICE

(71) Applicants: SHENZHEN CHINA STAR OPTOELECTRONICS TECHNOLOGY CO., LTD., Shenzhen, Guangdong (CN); WUHAN CHINA STAR OPTOELECTRONICS TECHNOLOGY CO., LTD, Wuhan, Hubei (CN)

(72) Inventors: Xianming Zhang, Guangdong (CN); Dan Cao, Guangdong (CN)

(73) Assignee: Shenzhen China Star Optoelectronics Technology Co., Ltd., Shenzhen, Guangdong (CN)

(*) Notice: Subject to any disclaimer, the term of this patent is extended or adjusted under 35 U.S.C. 154(b) by 180 days.

(21) Appl. No.: 14/646,853

(22) PCT Filed: Apr. 21, 2015

(86) PCT No.: PCT/CN2015/077056
§ 371 (c)(1),
(2) Date: May 22, 2015

(87) PCT Pub. No.: WO2016/149973
PCT Pub. Date: Sep. 29, 2016

(65) Prior Publication Data
US 2017/0040897 A1  Feb. 9, 2017

(30) Foreign Application Priority Data
Mar. 20, 2015 (CN) .......................... 2015 1 0124485

(51) Int. Cl.
*G05F 1/00* (2006.01)
*H02M 3/158* (2006.01)
(Continued)

(52) U.S. Cl.
CPC ......... *H02M 3/1582* (2013.01); *H02M 3/156* (2013.01); *G09G 3/3648* (2013.01);
(Continued)

(58) Field of Classification Search
CPC .......... H02M 3/1582; H02M 2001/009; G09G 2330/021; G05F 1/62
(Continued)

(56) References Cited

U.S. PATENT DOCUMENTS 6,437,545 B2 * 8/2002 Sluijs .................. H02M 3/1584
323/222
6,636,022 B2 * 10/2003 Sluijs ..................... H02M 3/158
323/222
(Continued)

*Primary Examiner* — Yuzhen Shen
(74) *Attorney, Agent, or Firm* — Andrew C. Cheng

(57) ABSTRACT

The disclosure is related to a boost-buck converting circuit, a power management module and a liquid crystal driving device. The boost-buck converting circuit comprises a voltage converting module and a switching module. The voltage converting module boosts an input voltage to obtain the analog supply voltage VAA or bucks the input voltage to obtain the digital supply voltage DVDD. The switching module controls the voltage converting module to boost or buck the input voltage. The embodiment of the disclosure shares a circuit set to generate the analog supply voltage VAA and the digital supply voltage DVDD. The structure of the circuit is not complicated and requires fewer components. The embodiment of the disclosure reduces the production costs and saves the area using of the panel.

7 Claims, 3 Drawing Sheets

(51) Int. Cl.
*H02M 3/156* (2006.01)
*H02M 1/00* (2006.01)
*G09G 3/36* (2006.01)

(52) U.S. Cl.
CPC ............. *G09G 2300/0408* (2013.01); *G09G 2300/0833* (2013.01); *H02M 2001/008* (2013.01); *H02M 2001/009* (2013.01)

(58) Field of Classification Search
USPC ................................ 345/212; 315/224, 291
See application file for complete search history.

(56) References Cited

U.S. PATENT DOCUMENTS

| | | | | |
|---|---|---|---|---|
| 2009/0040794 A1* | 2/2009 | Williams | ............ | H02M 3/1588 363/21.14 |
| 2011/0273422 A1* | 11/2011 | Park | ................... | G09G 3/3233 345/211 |
| 2014/0084889 A1* | 3/2014 | Kuroiwa | ............... | H02M 3/157 323/283 |

* cited by examiner

BOOST-BUCK CONVERTING CIRCUIT, POWER MANAGEMENT MODULE AND LIQUID CRYSTAL DRIVING DEVICE

CROSS REFERENCE

This application claims the benefit of, and priority to, Chinese Patent Application No. 201510124485. X, filed Mar. 20, 2015, titled "Boost-buck Converting Circuit, Power Management Module and Liquid Crystal Driving Device", the entire contents of which are incorporated by reference herein in its entirety.

FIELD OF THE INVENTION

The disclosure is related to the field of circuit technology, and more particularly to a boost-buck converting circuit, power management module and liquid crystal driving device.

BACKGROUND OF THE INVENTION

One of the flat panel displays more used in the current market is Liquid crystal display (LCD). The liquid crystal displays require various operating voltages during operation. The power management module of the driver circuit transforming the input voltage provides the operating voltage.

A common used power management module in the prior art is shown in FIG. 1. The Boost circuit, the buck circuit, the operation amplifier output circuit and the charge pump circuit are integrated in the power management ICs (PMIC) and the various required voltages are obtained by boosting, bucking, or amplifying the input voltage (Vin). In the driving circuit of the liquid crystal panel, two most common voltages are the analog supply voltage VAA and the digital supply voltage VDD. The analog voltage VAA is obtained from the boost circuit by boosting the input voltage Vin. The digital voltage is obtained from the buck circuit by bucking the input voltage Vin. Both of these two supply voltages are generated by two mutually independent circuits requiring more components. This kind of design not only increases production cost but also occupies a larger area in the integrated circuit.

SUMMARY OF THE INVENTION

The embodiment of the disclosure provides a boost-buck converting circuit, a power management module and a liquid crystal driving device. The embodiment of the disclosure shares a circuit set to generate the analog supply voltage VAA and the digital supply voltage DVDD. The embodiment of the disclosure also reduces the production costs and saves the area of the panel.

A first aspect of the embodiment of the disclosure provides a boost-buck converter circuit, comprising:

a voltage converting module boosting an input voltage to obtain an analog supply voltage VAA or bucking the input voltage to obtain a digital supply voltage DVDD; and a switching module controlling the voltage converting module to boost or buck the input voltage.

In some alternative embodiments, the switching module comprises a first switching circuit and a second switching circuit, wherein when the first switching circuit is conducted and the second switching circuit is disconnected, the voltage converting module boosts the input voltage to obtain the analog supply voltage VAA; when the first switching circuit is disconnected and the second switching circuit is conducted, the voltage converting module bucks the input voltage to obtain a digital supply voltage DVDD.

In some alternative embodiments, the voltage converting module comprises an inductance L1; the first switching circuit comprises a first switch tube Q1, wherein the first terminal of the inductance L1 connects to the second switching circuit; the second terminal of the inductance L1 connects to the second switching circuit and the first terminal of the first switch tube Q1; the second terminal of the first switch tube Q1 connects to a ground; the third terminal of the first switch tube Q1 is a control terminal; when the first switch tube Q1 is conducted, the second terminal of the inductance L1 generates the analog supply voltage VAA.

In some alternative embodiments, the voltage converting module comprises an inductance L1; the second switching circuit comprises a second switch tube Q2 and a first diode D1; wherein the cathode of the first diode D1 connects to the first terminal of the inductance L1 and the second terminal of the switch tube Q2; the anode of the first diode D1 connects to the ground; the second terminal of the inductance L1 connects to the first switching circuit; the first terminal of the second switch tube Q2 is an input terminal of the boost-buck converting circuit; the third terminal of the second switch tube Q2 is a control terminal; when the second switch tube Q2 is conducted, the second terminal of the inductance L1 generates the digital supply voltage DVDD.

In some alternative embodiments, the first switching circuit comprises a second diode D2; the anode of the second switch tube Q2 connects to the second terminal of the inductance L1; the cathode of the second diode D2 is the output terminal of the analog supply voltage VAA.

In some alternative embodiments, the second switching circuit comprises a third switch tube Q3; the first terminal of the third switch tube Q3 connects to the second terminal of the inductance L1; the second terminal of the third switch tube Q3 is the output terminal of the digital supply voltage DVDD; the third terminal of the third switch tube Q3 is a control terminal.

In some alternative embodiment, the first switch tube Q1 is an oxide semiconductor field effect transistor or a transistor.

In some alternative embodiments, the second switch tube Q2 and the third switch tube Q3 are oxide semiconductor field effect transistors or transistors.

A second aspect of the embodiment of the disclosure provides a power management module, comprising the boost-buck converting circuit as mentioned above. The boost-buck converting circuit outputs the analog supply voltage VAA and the digital supply voltage DVDD.

A third aspect of the embodiment of the disclosure provides a liquid crystal driving device, comprising the power management module as mentioned above.

The embodiments of the disclosure of the boost-buck converting circuit comprise the voltage converting module and the switching module. The switching module controls the voltage converting module to generate the analog supply voltage VAA or the digital supply voltage DVDD. The boost circuit and the buck circuit share a circuit set to reduce the number of the components of the boost-buck converting circuit. The embodiment of the disclosure reduces the production costs and saves the area using of the panel.

BRIEF DESCRIPTION OF THE DRAWINGS

In order to more clearly illustrate the prior art or the embodiments or aspects of the practice of the disclosure, the accompanying drawings for illustrating the prior art or the embodiments of the disclosure are briefly described as below. It is apparently that the drawings described below are merely some embodiments of the disclosure, and those skilled in the art may derive other drawings according to the drawings described below without creative endeavor.

DETAILED DESCRIPTION OF PREFERRED EMBODIMENTS

The following description with reference to the accompanying drawings is provided to clearly and completely explain the exemplary embodiments of the disclosure. It is apparent that the following embodiments are merely some embodiments of the disclosure rather than all embodiments of the disclosure. According to the embodiments in the disclosure, all the other embodiments attainable by those skilled in the art without creative endeavor belong to the protection scope of the disclosure.

The embodiment of the disclosure provides a boost-buck converting circuit, a power management module and a liquid crystal driving device. The embodiment of the disclosure shares a circuit set to generate the analog supply voltage VAA and the digital supply voltage DVDD. The structure of the circuit is not complicated and requires fewer components. The embodiment of the disclosure reduces the production costs and saves the area using of the panel. The embodiment of the disclosure in following is described in details with reference to the figures.

Figure 1:
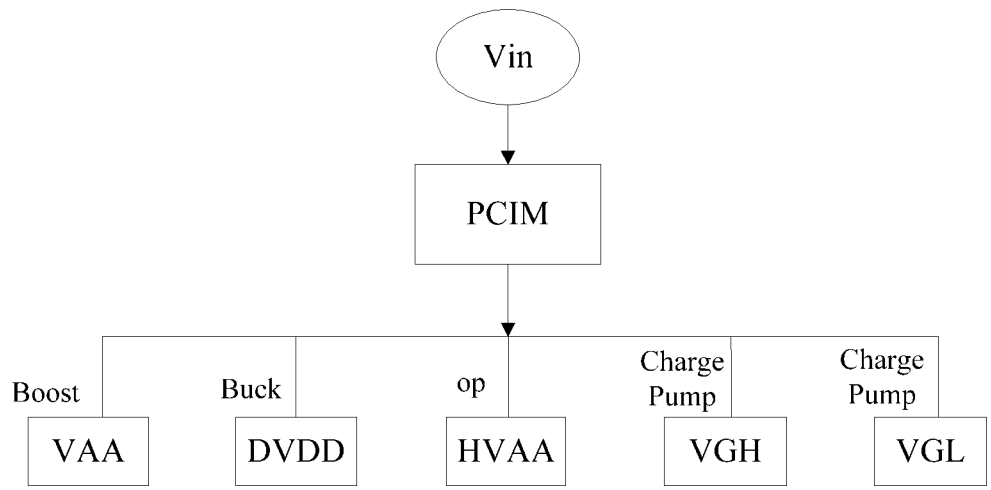
FIG. 1 is a schematic of the power management module according to the common prior art.
Figure 2:
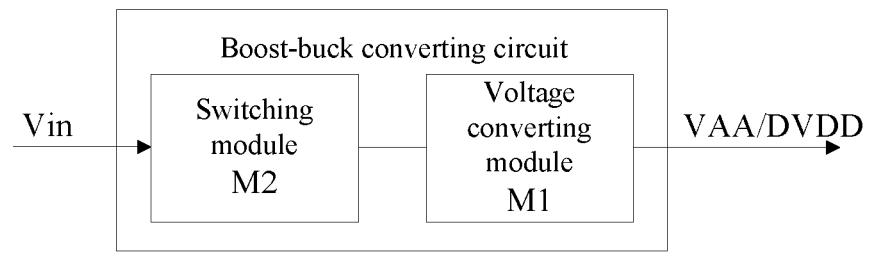
FIG. 2 is a schematic of the boost-buck converting circuit according to the embodiment of the disclosure.

Refer to FIG. 2 which is a schematic diagram of the boost-buck converting circuit according to the embodiment of the disclosure. As shown in FIG. 2, the boost-buck converter circuit comprises a voltage converting module M1 and a switching module M2 wherein the voltage converting module M1 boosts an input voltage to obtain an analog supply voltage VAA or bucking the input voltage to obtain a digital supply voltage DVDD. The switching module controls the voltage converting module to boost or buck the input voltage.

In some alternative embodiment, the input voltage is the direct current voltage, for example the 12V direct current voltage.

Specifically, the voltage converting module M1 uses the characteristics of electromagnetic induction and energy storage of an inductor to boost or buck the input voltage. Alternatively, the voltage converting module M1 comprises inductors or comprises inductors and conductors. Specifically, the number of resistors, capacitors and other components in the actual filter circuit is also added according to the requirement.

Specifically, the switching module M2 comprises a first switching circuit and a second switching circuit and is controlled to work in boosting mode or bucking mode respectively. For example, when the first switching circuit is conducted and the second switching circuit is disconnected, the voltage converting module M1 generates the analog supply voltage VAA and provides the analog supply voltage VAA through the output terminal to other modules in the liquid crystal driving device by releasing the saved power energy to achieve the boosting effect. When the second switching circuit is conducted and the first switching circuit is disconnected, the voltage converting module starts to store the power energy and generate the digital supply voltage by electromagnetic induction. The digital supply voltage DVDD is generated to other modules in the liquid crystal driving device through the output terminal of the digital supply voltage DVDD.

Alternatively, the output terminal of the voltage converting module M1 may be configured with two branches in order to separate the analogy supply voltage VAA and the digital supply voltage. The two branches described above are configured with switch tubes respectively in order to block undesired voltage signal. For example, the branch of the output terminal of the analog supply voltage is disposed with a switch tube. When the voltage converting module M1 generates the digital supply voltage DVDD, the switch tube is disconnected to avoid the digital supply voltage DVDD outputting from the branch of the output terminal of the analog supply voltage VAA.

The embodiment of the disclosure of the voltage converting module comprises the voltage converting module and the switching module. Controlling the voltage converting module through switching the switching module generates the analog supply voltage VAA and the digital supply voltage DVDD. The boost circuit and the buck circuit share a circuit set to reduce the number of the component of the boost-buck converting circuit. The embodiment of the disclosure reduces the production costs and saves the area using of the panel.

Figure 3:
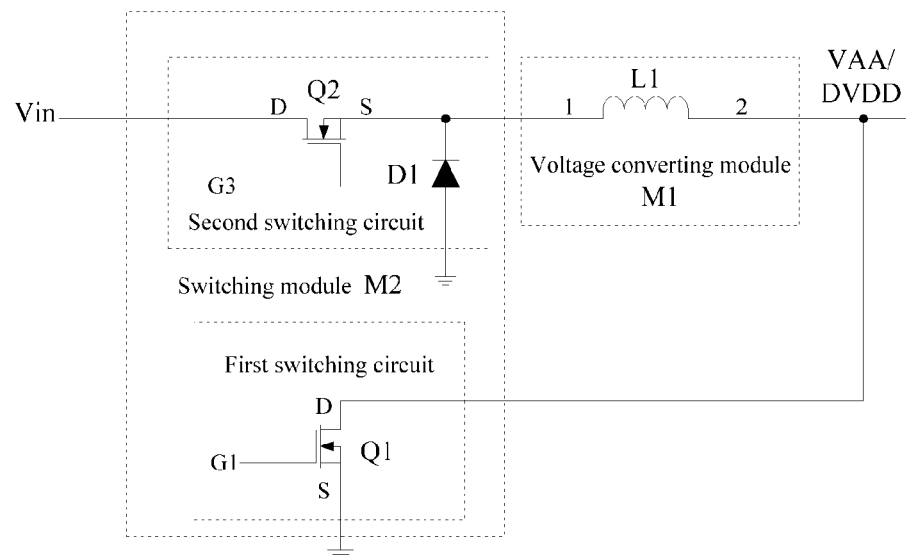
FIG. 3 is a circuit diagram of the boost-buck converting circuit according to the embodiment of the disclosure.

Refer to FIG. 3 which is a circuit diagram of the boost-buck converting circuit according to the embodiment of the disclosure. As shown in FIG. 3, the voltage converting module M1 comprises an inductance L1. The switching module M2 comprises a first switching circuit and a second switching circuit. The first switching circuit comprises a first switch tube Q1. The first switching circuit comprises a first switch tube Q1. The second switching circuit comprises a second switch tube Q2 and a first diode D1. The third terminal of the first switch tube Q1 and the third terminal of the second switch tube Q2 are control terminals. The external control signal is inputted the control terminal and the first switch tube Q1 and the second switch tube Q2 are controlled be conducted or disconnected respectively. The first terminal of the second switch tube Q2 is the input terminal of the boost-buck converting circuit. The input voltage Vin inputs the boost-buck converting circuit through the second switch tube Q2. The first terminal of the inductance L1 connects to the second terminal of the second switch tube Q2 and the cathode of the first diode D1. The second of the inductance L1 connects to the first terminal of the first switch tube Q1. The second terminal of the first switch tube Q1 connects to the ground. The anode of the first diode Q1 connects to the ground.

Specifically, when the first switch tube Q1 is conducted, the second switch tube Q2 is disconnected and the input voltage Vin suddenly stops inputting the first terminal of the inductance L1. Because of the characteristics of the electromagnetic induction of the inductance L1, the both terminal of the inductance L1 generate an induced voltage having the direction identical to the input voltage Vin. Then, the voltage of the second terminal of the inductance L1 is the analog supply voltage VAA required by the liquid crystal driving device. When the second switch tube Q2 is conducted, the first switch tube Q1 is disconnected and the input voltage Vin suddenly inputs the first terminal of the inductance L1. Because of the characteristics of the electromagnetic induction of the inductance L1, the both terminal of the inductance L1 generate an induced voltage having the direction contrary to the input voltage Vin. The first diode D1 is conducted continuously. The voltage of the second terminal of the inductance L1 is the digital supply voltage DVDD required by the liquid crystal driving device.

It is thus clear that the electromagnetic induction of the inductance L1 is generated by controlling the conducting or the disconnecting of the first switch tube Q1, the second switch tube Q2 and the first diode D1. Thus, the analog supply voltage VAA and the digital supply voltage DVDD required by the liquid crystal driving device are generated. The structure of the circuit is not complicated and requires fewer elements. The embodiment of the disclosure reduces the production costs and saves the panel area occupied by the boost-buck voltage circuit.

Figure 4:
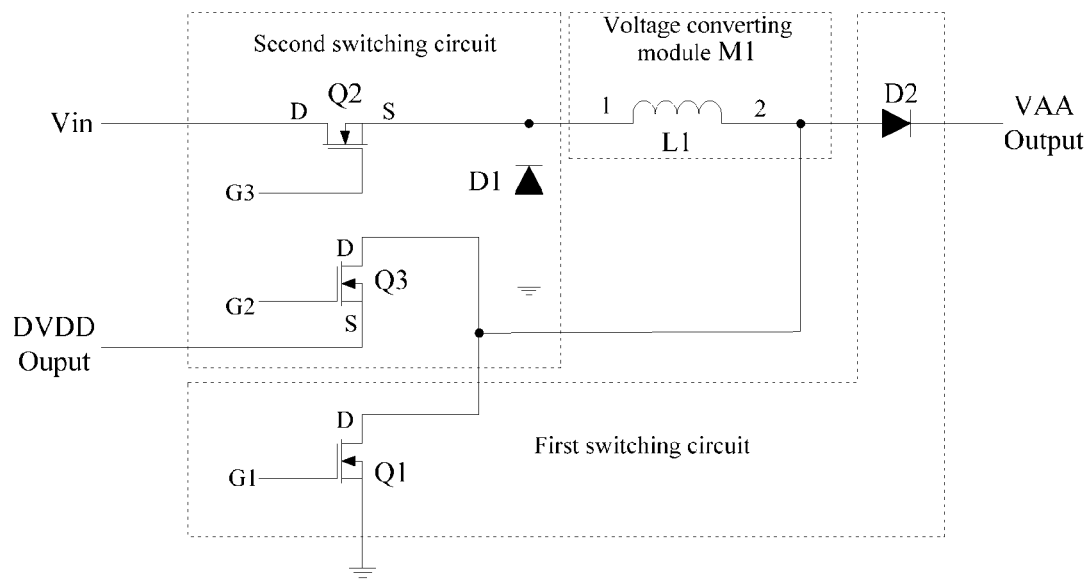
FIG. 4 is a circuit diagram of the boost-buck converting circuit according to another embodiment of the disclosure.

Refer to FIG. 4. The circuit diagram of the boost-buck converting circuit according to the embodiment of the disclosure is shown in FIG. 4. In some alternative embodiments, the first switching circuit comprises a second diode D2. The anode of the second switch tube Q2 connects to the second terminal of the inductance L1. The cathode of the second diode D2 is the output terminal of the analog supply voltage VAA. When the second switch circuit is conducted and the second terminal of the inductance L1 generates the digital supply voltage DVDD, the voltage outputted from the cathode of the second diode D2, that is the output terminal of the analog supply voltage VAA, is protected to avoid affecting from the digital supply voltage DVDD because the digital supply voltage DVDD is negative and has the characteristic of the conduction in one direction.

As shown in FIG. 4, in some alternative embodiments, the second switching circuit comprises a third switch tube Q3. The first terminal of the third switch tube Q3 connects to the second terminal of the inductance L1. The second terminal of the third switch tube Q3 is the output terminal of the digital supply voltage DVDD. The third terminal of the third switch tube Q3 is a control terminal. Specifically, when the first switch tube Q1 is conducted and the third switch tube Q3 is disconnected, the analog supply voltage VAA generated by the second terminal of the inductance L1 cannot pass through the third switch tube Q3. The voltage outputted from the output terminal of the digital supply voltage DVDD, that is the second terminal of the third switch tube Q3, is protected to avoid affecting from the analog supply voltage VAA.

Alternatively, the first switch tube Q1, the second switch tube Q2 and the third switch tube Q3 can be oxide semiconductor field effect transistors or transistors. For the case of the oxide semiconductor field effect transistor (MOSFET) in the embodiment of the disclosure, the time chart of the gate controlling signals of the first switch tube Q1, the second switch tube Q2 and the third switch tube Q3 is shown as FIG. 5.

Specifically, the output terminal of the analog supply voltage VAA and the input terminal of the digital supply voltage DVDD can be connected in series with a filter capacitor for power energy storage, filtering and clearing up the electromagnetic interference respectively.

In the embodiment of the disclosure, the electromagnetic induction of the inductance L1 is generated by controlling the conducting or the disconnecting of the first switch tube Q1, the second switch tube Q2 and the third diode D3. Thus, the analog supply voltage VAA and the digital supply voltage DVDD required by the liquid crystal driving device is cut off by the second diode D2 and third switch tube Q3 to avoid the output voltage generated from the output terminals of the VAA and DVDD being affected. The structure of the circuit in the embodiment of the disclosure is not complicated and requires fewer elements. The embodiment of the disclosure reduces the production costs and saves the panel area occupied by the boost-buck voltage circuit.

Figure 5:
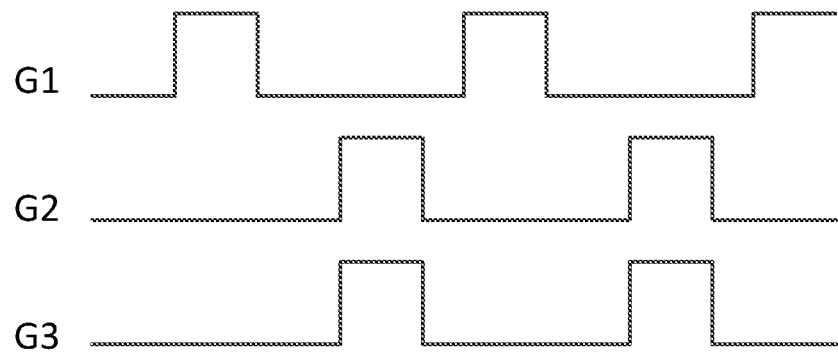
FIG. 5 is a time chart of the controlling signal of the switch tube in the boost-buck converting circuit according to the embodiment of the disclosure.

The embodiment of the disclosure also provides a power management module comprising the boost-buck converting circuit described in the embodiment as shown in FIG. 2 or any one of the boost-buck converting circuits described in the embodiments as shown in FIGS. 3 to 5. The boost-buck converting circuit described above can generate the analog supply voltage VAA and the digital supply voltage DVDD.

Figure 6:
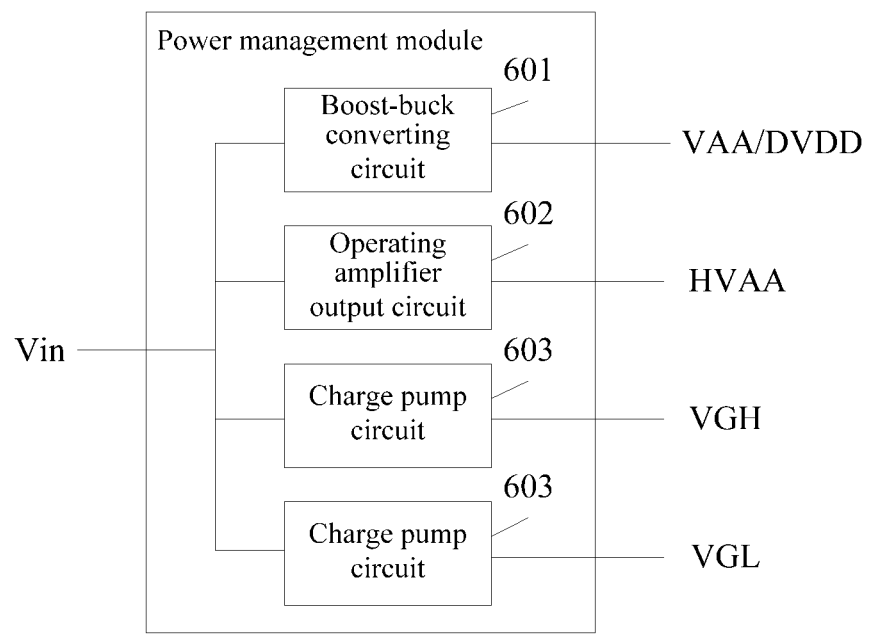
FIG. 6 is a schematic of the power management module according to the embodiment of the disclosure.

In some alternative embodiment, as shown in FIG. 6, the power management module not only comprises the boost-buck converting circuit 601 but also comprises an operating amplifier output circuit 602 and at least one charge pump circuit 603. The boost-buck converting circuit 601 can generate the analog supply voltage VAA and the digital supply voltage DVDD required by the liquid crystal driving device. The operating amplifier output circuit 602 can generate a liquid crystal driving upper limit voltage. The charge pump circuit 603 can generate a gate turn-on voltage VGH and a gate turn-off voltage VGL.

According to the description in FIGS. 3 to 5, the circuit structure of the power management module is not complicated and requires fewer elements. The embodiment of the disclosure reduces the production costs and saves the panel area occupied by the power management module.

The embodiments of the disclosure provide a liquid crystal driving device, comprising the power management module as mention above. According to the above description of the power management module, the liquid crystal driving device is not complicated and requires fewer components. The embodiment of the disclosure reduces the production costs and saves the panel area.

Note that the specifications relating to the above embodiments should be construed as exemplary rather than as limitative of the present disclosure. The equivalent variations and modifications on the structures or the process by reference to the specification and the drawings of the disclosure, or application to the other relevant technology fields directly or indirectly should be construed similarly as falling within the protection scope of the disclosure.

What is claimed is:

1. A boost-buck converting circuit, comprising:
a voltage converter for boosting an input voltage to obtain a supply voltage (VAA) or bucking the input voltage to obtain a supply voltage (DVDD);
a first switching circuit for controlling the voltage converter to boost the input voltage; and
a second switching circuit for controlling the voltage converter to buck the input voltage;
wherein the voltage converter comprises an inductor (L1);
wherein the first switching circuit comprises a first switch tube (Q1) and a second diode (D2); a first terminal of the first switch tube (Q1) connects to a second terminal of the inductor (L1), a second terminal of the first switch tube (Q1) connects to a ground, a third terminal of the first switch tube (Q1) is a control terminal, an anode of the second diode (D2) connects to the second terminal of the inductor (L1), and a cathode of the second diode (D2) connects to an output terminal of the supply voltage (VAA);

wherein the second switching circuit comprises a second switch tube (Q2), a first diode (D1) and a third switch tube (Q3); a first terminal of the second switch tube (Q2) connects to the input voltage, a second terminal of the second switch tube (Q2) connects to a first terminal of the inductor (L1) and a cathode of the first diode (D1), a third terminal of the second switch tube (Q2) is a control terminal, an anode of the first diode (D1) connects to the ground, a first terminal of the third switch tube (Q3) connects to the second terminal of the inductor (L1), a second terminal of the third switch tube (Q3) connects to an output terminal of the supply voltage (DVDD), and a third terminal of the third switch tube (Q3) is a control terminal;

wherein the voltage converter boosts the input voltage to generate the supply voltage (VAA) on the output terminal of the supply voltage (VAA) at a condition of the first switch tube (Q1) being conducted while the second and third switch tubes (Q2, Q3) both being disconnected;

wherein the voltage converter bucks the input voltage to generate the supply voltage (DVDD) on the output terminal of the supply voltage (DVDD) at a condition of the first switch tube (Q1) being disconnected while the second and third switch tubes (Q2, Q3) being simultaneously conducted.

2. The boost-buck converting circuit according to claim 1, wherein the first switch tube (Q1) is an oxide semiconductor field effect transistor or a transistor.

3. The boost-buck converting circuit according to claim 1, wherein the second switch tube (Q2) and the third switch tube (Q3) are oxide semiconductor field effect transistors or transistors.

4. A power management module, comprising a boost-buck converting circuit being switchable for outputting a first supply voltage (VAA) or a second supply voltage (DVDD), the boost-buck converting circuit comprising:
  a voltage converter for boosting an input voltage to generate the first supply voltage (VAA) or bucking the input voltage to generate the second supply voltage (DVDD);
  a first switching circuit for controlling the voltage converter to boost the input voltage; and
  a second switching circuit for controlling the voltage converter to buck the input voltage;
  wherein the voltage converter comprises an inductor (L1);
  wherein the first switching circuit comprises a first switch tube (Q1) and a second diode (D2); a first terminal of the first switch tube (Q1) connects to a second terminal of the inductor (L1), a second terminal of the first switch tube (Q1) connects to a ground, a third terminal of the first switch tube (Q1) is a control terminal, an anode of the second diode (D2) connects to the second terminal of the inductor (L1), and a cathode of the second diode (D2) connects to an output terminal of the first supply voltage (VAA);
  wherein the second switching circuit comprises a second switch tube (Q2), a first diode (D1) and a third switch tube (Q3); a first terminal of the second switch tube (Q2) connects to the input voltage, a second terminal of the second switch tube (Q2) connects to a first terminal of the inductor (L1) and a cathode of the first diode (D1), a third terminal of the second switch tube (Q2) is a control terminal, an anode of the first diode (D1) connects to the ground, a first terminal of the third switch tube (Q3) connects to the second terminal of the inductor (L1), a second terminal of the third switch tube (Q3) connects to an output terminal of the second supply voltage (DVDD), and a third terminal of the third switch tube (Q3) is a control terminal;
  wherein the voltage converter boosts the input voltage to generate the first supply voltage (VAA) on the output terminal of the first supply voltage (VAA) at a condition of the first switch tube (Q1) being conducted while the second and third switch tubes (Q2, Q3) both being disconnected;
  wherein the voltage converter bucks the input voltage to generate the second supply voltage (DVDD) on the output terminal of the second supply voltage (DVDD) at a condition of the first switch tube (Q1) being disconnected while the second and third switch tubes (Q2, Q3) being simultaneously conducted.

5. The power management module according to claim 4, further comprising an operating amplifier output circuit and charge pump circuits; wherein the operating amplifier output circuit is for generating a liquid crystal driving upper limit voltage (HVAA) according to the input voltage, and the charge pump circuits are for generating a gate turn-on voltage (VGH) and a gate turn-off voltage (VGL) according to the input voltage.

6. A liquid crystal driving device, comprising a power management module; the power management module comprises a boost-buck converting circuit being switchable for outputting a first supply voltage (VAA) or a second supply voltage (DVDD), the boost-buck converting circuit comprising:
  a voltage converter for boosting an input voltage to generate the first supply voltage (VAA) or bucking the input voltage to generate the second supply voltage (DVDD);
  a first switching circuit for controlling the voltage converter to boost the input voltage; and
  a second switching circuit for controlling the voltage converter to buck the input voltage;
  wherein the voltage converter comprises an inductor (L1);
  wherein the first switching circuit comprises a first switch tube (Q1) and a second diode (D2); a first terminal of the first switch tube (Q1) connects to a second terminal of the inductor (L1), a second terminal of the first switch tube (01) connects to a ground, a third terminal of the first switch tube (Q1) is a control terminal, an anode of the second diode (D2) connects to the second terminal of the inductor (L1), and a cathode of the second diode (D2) connects to an output terminal of the first supply voltage (VAA);
  wherein the second switching circuit comprises a second switch tube (Q2), a first diode (D1) and a third switch tube (Q3); a first terminal of the second switch tube (Q2) connects to the input voltage, a second terminal of the second switch tube (Q2) connects to a first terminal of the inductor (L1) and a cathode of the first diode (D1), a third terminal of the second switch tube (Q2) is a control terminal, an anode of the first diode (D1) connects to the ground, a first terminal of the third switch tube (Q3) connects to the second terminal of the inductor (L1), a second terminal of the third switch tube (Q3) connects to an output terminal of the second supply voltage (DVDD), and a third terminal of the third switch tube (Q3) is a control terminal;
  wherein the voltage converter boosts the input voltage to generate the first supply voltage (VAA) on the output terminal of the first supply voltage (VAA) at a condition of the first switch tube (Q1) being conducted while the second and third switch tubes (Q2, Q3) both being disconnected;

wherein the voltage converter bucks the input voltage to generate the second supply voltage (DVDD) on the output terminal of the second supply voltage (DVDD) at a condition of the first switch tube (Q1) being disconnected while the second and third switch tubes (Q2, Q3) being simultaneously conducted.

7. The liquid crystal driving device according to claim 6, wherein the power management module further comprises an operating amplifier output circuit and charge pump circuits; the operating amplifier output circuit is for generating a liquid crystal driving upper limit voltage (HVAA) according to the input voltage, and the charge pump circuits are for generating a gate turn-on voltage (VGH) and a gate turn-off voltage (VGL) according to the input voltage.

* * * * *